United States Patent
Lu et al.

(10) Patent No.: US 8,146,011 B2
(45) Date of Patent: Mar. 27, 2012

(54) VIRTUAL KEYBOARD INPUT MEANS WITH MULTIPLE INPUT FOCUSES AND METHOD THEREOF

(75) Inventors: Zhou Lu, Haidian District Beijing (CN); Huazhang Yu, Haidian District Beijing (CN)

(73) Assignee: Feitian Technologies Co. Ltd., Haidian District, Beijing (CN)

( * ) Notice: Subject to any disclaimer, the term of this patent is extended or adjusted under 35 U.S.C. 154(b) by 336 days.

(21) Appl. No.: 12/667,235

(22) PCT Filed: Nov. 18, 2009

(86) PCT No.: PCT/CN2009/075021
§ 371 (c)(1),
(2), (4) Date: Dec. 30, 2009

(87) PCT Pub. No.: WO2010/057433
PCT Pub. Date: May 27, 2010

(65) Prior Publication Data
US 2011/0191709 A1 Aug. 4, 2011

(30) Foreign Application Priority Data

Nov. 19, 2008 (CN) .......................... 2008 1 0226881
Nov. 19, 2008 (CN) .......................... 2008 1 0226882

(51) Int. Cl.
*G06F 3/048* (2006.01)
*G09G 5/00* (2006.01)
(52) U.S. Cl. ......... 715/773; 345/156; 345/168; 345/173
(58) Field of Classification Search .................. 715/773; 345/156, 168, 173
See application file for complete search history.

(56) References Cited

U.S. PATENT DOCUMENTS

| | | | | |
|---|---|---|---|---|
| 5,008,847 A * | 4/1991 | Lapeyre | ......................... | 708/146 |
| 6,104,384 A * | 8/2000 | Moon et al. | ................... | 345/168 |
| 2005/0169527 A1 * | 8/2005 | Longe et al. | .................. | 382/177 |
| 2006/0232551 A1 * | 10/2006 | Matta | ............................. | 345/156 |
| 2008/0288776 A1 * | 11/2008 | Kim | ............................... | 713/168 |
| 2008/0320410 A1 * | 12/2008 | Whytock et al. | .............. | 715/773 |
| 2009/0251422 A1 * | 10/2009 | Wu et al. | ....................... | 345/173 |

\* cited by examiner

Primary Examiner — Tadeese Hailu

(57) ABSTRACT

The invention discloses a virtual keyboard input means with multiple input focuses and method thereof, relating to the field of information security. The means includes a control module and a virtual keyboard. The virtual keyboard is a virtual keyboard unit controlled by the control module or a virtual keyboard module communicated with the control module. The method includes that displaying virtual keyboard and multiple simulated input/output unit in the virtual keyboard input mode and setting corresponding focus indicator; if a user clicks simulated input/output unit, the control module sets the current input focus indicator as the focus indicator of the simulated input/output unit, if the user clicks virtual keyboard, virtual keyboard unit controlled by the control module or a virtual keyboard module communicated with the control module determines corresponding character according to the position of the cursor and performs corresponding processing. The invention improves the security of input with the virtual keyboard.

20 Claims, 4 Drawing Sheets

# VIRTUAL KEYBOARD INPUT MEANS WITH MULTIPLE INPUT FOCUSES AND METHOD THEREOF

FIELD OF THE INVENTION

The invention relates to information security field, more particularly, to a virtual keyboard input means with multiple input focuses and method thereof.

BACKGROUND OF THE INVENTION

Monitoring keyboard and intercepting Windows text are two kinds of general attacking ways for stealing password.

In order to prevent the keyboard from being monitored, virtual keyboard is used for entering characters. Virtual keyboard is a program which simulates the operation of keyboard by software and inputs characters by mouse clicking. Trojan can record password input by a physical keyboard. The password input by virtual keyboard can be prevented from being recorded by Trojan. However, when a user inputs a character by the virtual keyboard, the mouse will click on the virtual keyboard which results in that the input control loses focus and can not receive the input character. So the position of focus must be fixed if the virtual keyboard is used, which brings inconvenience to the using of the virtual keyboard. The virtual keyboard of Windows XP system, which prevents the control from losing focus, can not prevent Trojan because the virtual keyboard uses keyboard codes which are consistent with the keys of a physical keyboard.

In order to increase the difficulty of intercepting window text by illegal users, owner-draw control, which uses non-input control without input focus as base class for displaying and outputting, operates with the virtual keyboard to perform the human-computer interaction. Since the output control has no input focus, a method is needed for confirming output control corresponding to the current entry when multiple outputs (for example, modifying the interface of PIN code) are performed at the same time. Mostly the method for confirming the output position is to determine where a mouse clicks on. But if the virtual keyboard is used, the position where the mouse clicks on is always on the virtual keyboard whenever determination of the output position is needed. So the general method cannot be used in this case.

SUMMARY OF THE INVENTION

In order to enhance the security of virtual keyboard input, a virtual keyboard input means with multiple input focuses and method thereof is provided as follows:

A virtual keyboard input means with multiple input focuses, wherein the means includes a control module and a virtual keyboard which is a virtual keyboard unit controlled by the control module or a virtual keyboard module communicated with the control module;

if the virtual keyboard is a virtual keyboard unit controlled by the control module, the control module includes:

a plurality of standard input/output units adapted to receive mouse click message;

a plurality of simulated input/output units adapted to receive mouse click message, the number of the standard input/output units equals to that of the simulated input/output units and the standard input/output units have a relationship of one-to-one correspondence with the simulated input/output units;

an input focus indicator setting unit adapted to set the current input focus indicator as the focus indicator of the standard input/output unit according to the correspondence relationship between the standard input/output unit and the focus indicator when the standard input/output unit is clicked by the mouse, and to set the current input focus indicator as the focus indicator of the simulated input/output unit according to the correspondence relationship between the simulated input/output unit and the focus indicator when the simulated input/output unit is clicked by the mouse;

a virtual keyboard unit adapted to store mapping relationship between the coordinates and the characters and confirm the corresponding character according to the position of mouse click if the user clicks the virtual keyboard with the mouse; in the mode of the virtual keyboard input mode, if the character is a keyboard character, the corresponding simulated input/output unit will be found according to the current input focus indicator and stores the keyboard character in a storage unit corresponding to the found simulated input/output unit; if the character is a status character, the virtual keyboard unit will be subjected to status processing according to the status; if the character is a control character, the corresponding simulated input/output unit will be found according to the current input focus indicator and the simulated input/output unit will be controlled to redraw the appearance of the simulated input/output unit according to the control character; the step of redrawing the appearance of the simulated input/output unit includes shifting the cursor and/or deleting the content displayed in the simulated input/output unit and the content stored in the storage area;

a displaying unit adapted to display the plurality of standard input/output unit in the standard keyboard input mode, and to display virtual keyboard and the plurality of simulated input/output unit in the virtual keyboard input mode;

the means also includes a storage module, the storage module includes:

a plurality of storage units adapted to store character input by the user by using the standard keyboard or the virtual keyboard, the number of the storage units are equal with that of the standard input/output units, and each of the storage units corresponds to a pair of standard input/output unit and simulated input/output unit having the correspondence relationship;

or if the virtual keyboard is a virtual keyboard module communicated with the control module, the control module includes:

a standard input/output unit adapted to receive mouse click message and characters input by the user by using a standard keyboard;

a simulated input/output unit adapted to receive mouse click message and characters input by the user by using of the virtual keyboard;

an input focus indicator setting unit adapted to set the current input focus indicator as the focus indicator of the standard input/output unit when the standard input/output unit is clicked by the mouse, and to set the current input focus indicator as the focus indicator of the simulated input/output unit when the simulated input/output unit is clicked by the mouse;

a virtual keyboard message processing unit adapted to inform the corresponding simulated input/output unit to receive the keyboard character cached by the virtual keyboard module according to the current input focus indicator when the virtual keyboard message sent by the virtual keyboard module is received;

a storage unit adapted to store characters input by the user by using of the standard keyboard or virtual keyboard;

a displaying unit adapted to display standard input/output unit in the standard keyboard input mode, and to display virtual keyboard and simulated input/output unit in the virtual keyboard input mode;

the virtual keyboard module includes:

a mapping unit adapted to store the mapping relationship between coordinates and characters, the correspondence relationship between the simulated input/output unit and the focus indicator, the correspondence relationship between the standard input/output unit and the focus indicator, and to output the corresponding character according to the position of mouse click if any;

a cache unit adapted to cache keyboard character if the character output by the mapping unit is a keyboard character;

a virtual keyboard message sending unit adapted to send virtual keyboard message to the control module if the cache unit has cached a keyboard character;

a status processing unit adapted to process the virtual keyboard according to the corresponding status if the mapping unit output a status character.

An input method of virtual keyboard with multiple input focuses, wherein the method includes:

in the virtual keyboard input mode, displaying virtual keyboard and a plurality of simulated input/output units and setting corresponding focus indicator for each of the simulated input/output units within the specified area, the virtual keyboard is a virtual keyboard unit controlled by the control module or a virtual keyboard module communicated with the control module;

If the keyboard is a virtual keyboard unit controlled by the control module, the control module waits for receiving mouse message, wherein the control module determines whether the mouse message is generated from clicking the virtual keyboard by the user, if so, the control module controls the virtual keyboard unit to determine the corresponding character according to the position clicked by the mouse and determines the character is a keyboard character, a control character, or a status character;

If the character is a keyboard character, with the control of the control module, the virtual keyboard unit finds a corresponding simulated input/output unit according to the current input focus indicator and finds a storage unit corresponding to the found simulated input/output unit from the existed plurality of storage units and stores the keyboard character into the found storage unit, the number of the plurality of storage units equals to that of the plurality of the simulated input/output units and the storage units have a relationship of one-to-one correspondence with the simulated input/output units;

if the character is a status character, with the control of the control module, the virtual keyboard unit is subjected to status processing according to the status;

if the character is a control character, with the control of the control module, the virtual keyboard unit finds a corresponding simulated input/output unit according to the current input focus indicator and controls the simulated input/output unit to redraw the appearance of the simulated input/output unit according to the control character; the step of redrawing the appearance of the simulated input/output unit includes shifting the cursor and/or deleting the content displayed in the simulated input/output unit and the content stored in the storage area;

Otherwise, no performance is executed;

If the virtual keyboard is a virtual keyboard module communicated with the control module, the control module and the keyboard module wait for receiving the mouse message, the keyboard module determines the corresponding character according to the position clicked by the mouse and determines the character is a keyboard character, a control character, or a status character;

If the character is a keyboard character, the character is obtained from the virtual keyboard module by the control module, the virtual keyboard module finds a corresponding simulated input/output unit according to the current input focus indicator and finds a storage unit corresponding to the found simulated input/output unit from the existed plurality of storage units and stores the keyboard character into the found storage unit, the number of the plurality of storage units equals to that of the plurality of the simulated input/output units and the storage units have a relationship of one-to-one correspondence with the simulated input/output units;

if the character is a status character, the virtual keyboard module is subjected to status processing according to the status;

if the character is a control character, the virtual keyboard module finds a corresponding simulated input/output unit according to the current input focus indicator and controls the simulated input/output unit to redraw the appearance of the simulated input/output unit according to the control character; the step of redrawing the appearance of the simulated input/output unit includes shifting the cursor and/or deleting the content displayed in the simulated input/output unit and the content stored in the storage area.

The advantage of this invention is in that it solved the deficiency of the prior art. With the simple construction and stable performance, multiple output controls share one virtual keyboard. The invention meets the actual need and provides a safe and improved human-computer interaction.

DETAILED DESCRIPTION OF THE INVENTION

Objects, technical solutions and advantages of the invention will be easily understood by reference to the following description of embodiments in conjunction with the accompanying drawings.

Embodiment 1

Figure 1:
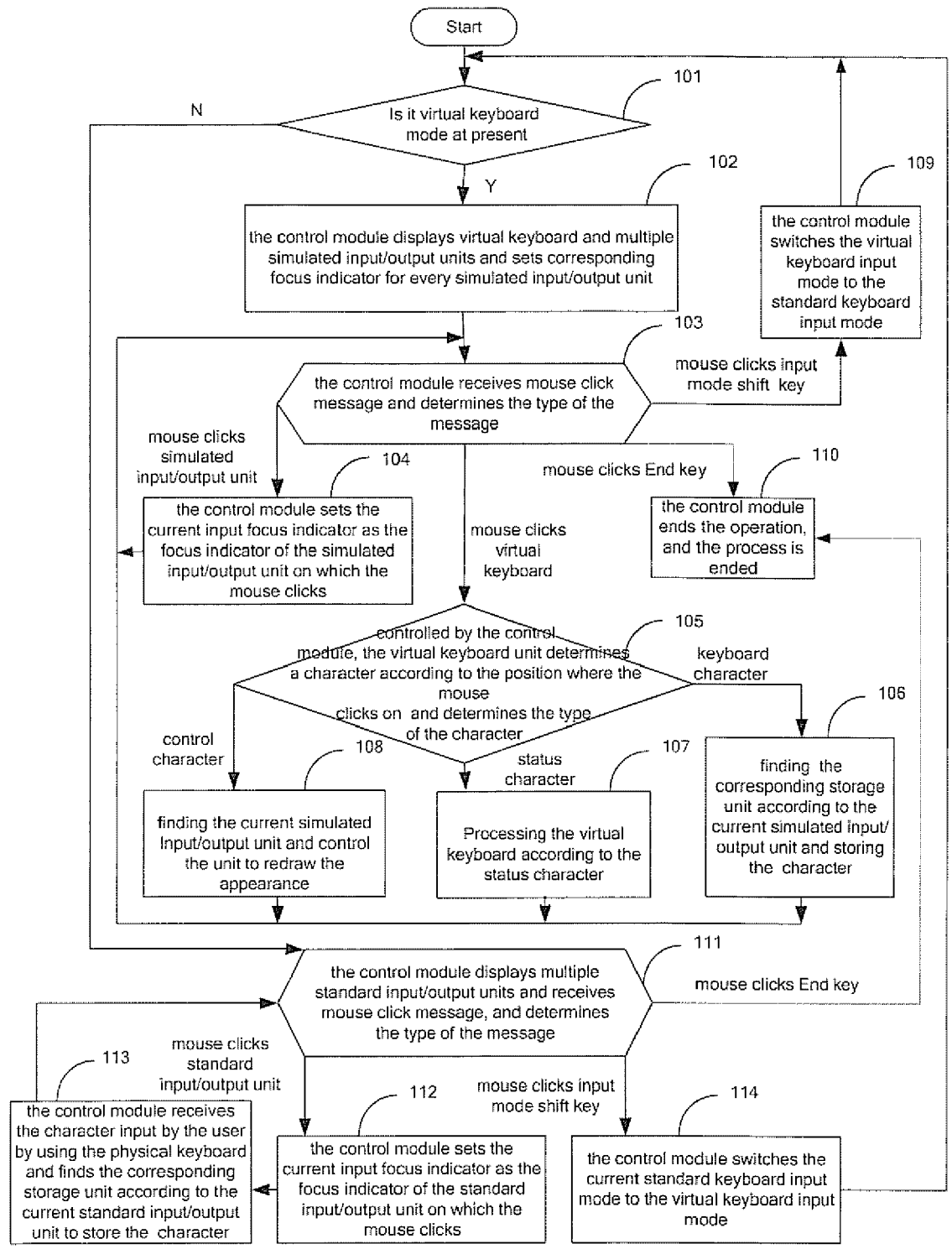
FIG. 1 is a flow chart illustrating an input method of virtual keyboard with multiple input focuses according to embodiment 1 of the invention.

Referring to FIG. 1, the embodiment of the invention provides an input method of a virtual keyboard with multiple input focuses.

Step 101: a control module determines whether current input mode is virtual keyboard input mode, if so, go to step 102; otherwise, go to step 111.

Step 102: the control module displays virtual keyboard and multiple simulated input/output units within specified area and sets corresponding focus indicator for each of the simulated input/output units; generally, the virtual keyboard is displayed in the specified area in a form of a sub-window; and in the virtual keyboard input mode, the control module may further hide a standard input/output unit for not displaying the standard input/output unit to a user.

The simulated input/output unit has a function of drawing and can be used to draw the appearance of the simulated input/output unit. When the user inputs a character to the simulated input/output unit, the simulated input/output unit draws symbol such as dot or * in the display box to simulate inputting character. In addition, the simulated input/output unit draws a highlight vertical line in specified position at the cursor area to simulate input status of cursor; the simulated input/output unit draws a highlight vertical line and normal vertical line in turns at regular intervals at the specified position of cursor area to simulate the twinkle of the cursor, etc.

In addition, the simulated input/output unit has a function of calculating cursor position. With the shift of characters being input, the cursor position may be calculated automatically. For example, when the characters are input increasingly, the position where the cursor shift right to is calculated; when the characters are deleted, the position where the cursor shift left to is calculated; when the mouse clicks on the simulated input/output unit, the position of mouse click where the cursor shift to is calculated, etc.

Step 103: the control module receives message of mouse click (WM_BUTTONDOWN) and determines the mouse clicks on the simulated input/output unit, input mode shift key or End key, if the mouse clicks on one of the simulated input/output units described above, go to step 104; if the mouse clicks on the virtual keyboard, go to step 105; if the mouse clicks on the input mode shift key, go to step 109; if the mouse clicks on the End key, go to step 110.

Step 104: the control module sets the current input focus indicator as the focus indicator of the simulated input/output unit on which the mouse clicks, then go back to step 103.

Step 105: with the control of the control module, the virtual keyboard unit determines a corresponding character according to the position on which the mouse clicks and determines the character is a keyboard character, a control character, or a status character; if the character is a keyboard character, go to step 106; if the character is a status character, go to step 107; if the character is a control character, go to step 108.

The mapping relationship between the coordinates of the virtual keyboard and the characters is pre-stored in the virtual keyboard unit. When the mouse clicks on a coordinate point on the screen, a character corresponding to the coordinate point is input. The characters include keyboard characters and status characters. The keyboard characters include letters and numbers. The status characters include characters except keyboard characters, for example, Shift key, CapsLock key etc.

Step 106: with the control of the control module, the virtual keyboard unit finds the corresponding simulated input/output unit according to the current input focus indicator, and finds a storage unit corresponded to the simulated input/output unit from the existed a plurality of storage units, then stores the keyboard character in the found storage unit, then go back to step 103.

In the embodiment, there are a plurality of standard input/output units and simulated input/output units as well. The standard input/output units and the simulated input/output units are equal in numbers and have one-to-one correspondence relationship. Every pair of input/output unit and the simulated input/output unit having the one-to-one correspondence relationship corresponds to a shared storage unit. The shared storage unit is for storing the character received by the standard input/output unit or the simulated input/output unit. The character, which is input by the user to the standard input/output unit or the simulated input/output unit, will be stored in the shared storage unit. For example, the user inputs characters A and B by standard keyboard, and inputs characters C and D by virtual keyboard. All of A, B, C and D are stored in the shared storage unit.

Step 107: with control of the control module, the virtual keyboard unit is subjected to status processing according to the status of the status character, the go to step 103.

For example, if the status character is CapsLock key, the virtual keyboard unit redraws the virtual keyboard, in which the letters displayed are capitalized. Generally, the mapping relationship between the coordinates of the redrawn virtual keyboard and the characters are different from the previous mapping relationship between the coordinates of the virtual keyboard and the characters. The subsequent process will be performed according to the new mapping relationship between the coordinates of the redrawn virtual keyboard and the characters.

Step 108: with control of the control module, the virtual keyboard unit finds the corresponding simulated input/output unit according to the current input focus indicator and the simulated input/output unit redraws the appearance of the simulated input/output unit according to the control character, the step of redrawing the appearance of the simulated input/output unit includes shifting the cursor or/and deleting the content displayed in the simulated input/output unit or the content stored in the storage area, then go back to step 103.

In the embodiment, the control character for controlling the cursor position includes Backspace key, Left key, Right key, Home key, and End key etc.

Redrawing the appearance of the simulated input/output unit according to the control character makes the position change of the cursor displayed in the simulated input/output unit (including right shift and left shift); displaying the change of the displayed content and the content stored in the storage area (deleting). For example, when the control character is Left key, the appearance of the simulated input/output unit is redrew and the cursor shifts to left by one digit; when the control character is End key, the appearance of the simulated input/output unit is redrew and the cursor shifts to the end of the current character string; when the control character is Backspace key, the character on which the cursor is located is deleted from the storage unit and the cursor is shifted left by one digit and the character string or dot string is redrew according to the content of the storage unit. In the embodiment, the drawn and displayed content in the simulated input/output unit is expressed in dot string.

Step 109: the control module switches the current virtual keyboard input mode to the standard keyboard input mode; then go back to step 101.

Step 110: the control module ends the operation, and the process is ended.

Step 111: The current mode is standard keyboard input mode, the control module displays a plurality of standard input/output units and receives mouse click message, and determines the mouse clicks the standard input/output unit, the input mode shift key or End key, if the mouse clicks on the standard input/output unit, go to step 112; if the mouse clicks on the input mode shift key, go to step 114; if the mouse clicks on the End key, go to step 110.

Generally, in the standard keyboard input mode, the control module may also hide the simulated input/output unit, that is, and does not to display the simulated input/output unit to the user.

Step 112: the control module sets the current input focus indicator as the focus indicator of the standard input/output unit.

Step 113: the control module receives the character input by the user by using the physical keyboard and finds the corresponding standard input/output unit according to the current input focus indicator, that is, the standard input/output unit the user clicked, and finds the storage unit corresponding to standard input/output unit clicked by the user in a plurality of storage units and stores the character in the found storage unit, then go back to step 111.

In the embodiment, instead, in the standard input mode, the control module stores the character input to the standard input/output unit by the user by using the virtual keyboard other than the control module stores the input character to the standard input/output unit by the user by using the physical keyboard in the standard input mode above. That is, the step 113 can be substituted by the following steps:

The control module displays the virtual keyboard. The user clicks the virtual keyboard by the mouse. With the control of the control module, the virtual keyboard unit determines the corresponding character according to the mouse click position and determines the corresponding character is a keyboard character, a status character or a control character; if the corresponding character is a keyboard character, with the control of the control module, the virtual keyboard unit finds the corresponding standard input/output unit according to the current input focus indicator and finds a storage unit corresponding to the found standard input/output unit from a plurality of storage units and stores the keyboard character into the found storage unit; if the corresponding character is a status character, with the control of the control unit, the virtual keyboard unit is subjected to status processing according to the corresponding status of the status character; if the corresponding character is a control character, with the control of the control unit, the virtual keyboard unit finds a corresponding standard input/output unit according to the current input focus indicator and controls the standard input/output unit to redraw the appearance of the standard input/output unit according to the control character or further includes the operation such as deleting the content of the standard input/output unit and the content of the storage area and going back to step 111. In the embodiment, the content drawn and displayed in the standard input/output unit is expressed by character string. The operation of deleting or increasing the content means increasing or deleting the character string.

Step 114: the control module modifies the current standard keyboard input mode to the virtual keyboard input mode; then goes back to step 101.

The method described above further includes that the control module checks the current input focus regularly and sets the current input focus indicator as the focus indicator of the input/output unit. For example, the control module triggers MFC timer message ((WM_TIMER) at preset time intervals and checks the current input focus with the fact of receiving the message, and sets the current input focus indicator as focus indicator of input/output unit where the input indicator is.

Furthermore, in the embodiment, the virtual keyboard unit can modify the stored mapping relationship between the stored coordinates and the characters randomly, which enhances the security.

In the embodiment, the control module includes Windows interface and Windows message processing program. The Windows message processing program is bonded with the Windows interface by the Windows function. In addition, the Windows message processing program is bonded with the control by Windows functions SetWindowLang and GetWindowLang instead of the default message mapping defined by MFC. The switch between the input modes can be implemented by CheckBox control of control module window. The standard input/output unit can be the Edit control of main control module window. The simulated input/output unit includes self-drawing control based on Button control without input function and customized Windows message processing program. Because the Button has not input function, the simulated input/output unit has no input focus defined by MFC.

In addition, in the embodiment, in the virtual keyboard input mode, instead, the control module also can store the character input by the simulated input/output unit via the physical keyboard other than the virtual keyboard unit stores the character input by the user via the virtual keyboard into the corresponding storage unit. With the control of the control module. That is to say, steps 105-107 can be substituted by the following steps:

The control module receives a character input by the user by physical keyboard and finds the corresponding simulated input/output unit according to the current input focus indicator, then finds the storage unit corresponding to the simulated input/output unit from the plurality of storage units and stores the character in the storage unit.

In the embodiment, there are many kinds of Windows messages which the control module can process, for example, INT_PTR CALLBACK MyWndProc(HWND hWnd, UINT message, WPARAM wParam, LPARAM lParam)

```
{
    UINT wmId, wmEvent;
    switch (message)
    {
    case WM_INITDIALOG:
        // dialogue box initializing
    OnMyInitDialog ( );
        break;
    case WM_COMMAND:
        wmId = LOWORD(wParam);
        wmEvent = HIWORD(wParam);
        switch (wmId)
        {
        // click "yes"
        case IDOK:
            OnMyOK( );
            break;
        // click " cancel"
        case IDCANCEL:
            OnMyCancel( );
            break;
        // switching input mode
        case IDC_CHECK:
            OnMyCheck( );
            break;
        // password inputting
        case IDC_EDIT:
            if(wmEvent == EN_CHANGE)
                OnMyChangeEdit ( );
            break;
        default:
            break;
        }
        break;
    // control self-drawing
    case WM_DRAWITEM:
    OnMyDrawItem(wParam,lParam);
        break;
    // mouse clicking
    case WM_LBUTTONDOWN:
        OnMyLButtonDown (wParam,lParam);
        break;
    // interface refreshing
    case WM_SHOWWINDOW:
    OnMyShowWindow( );
    break;
```

-continued

```
    // interface drawing
    case WM_PAINT:
        OnMyPaint( );
        break;
    //   interface destroying
    case WM_DESTROY:
        OnMyDestroy ( );
        break;
    // sleep waking up
    case WM_POWERBROADCAST:
        OnMyPowerBroadcast( );
        break;
    default:
        break;
    }
    return DefWindowProc(hWnd, message, wParam, lParam);
}
```

Embodiment 2

Figure 2:
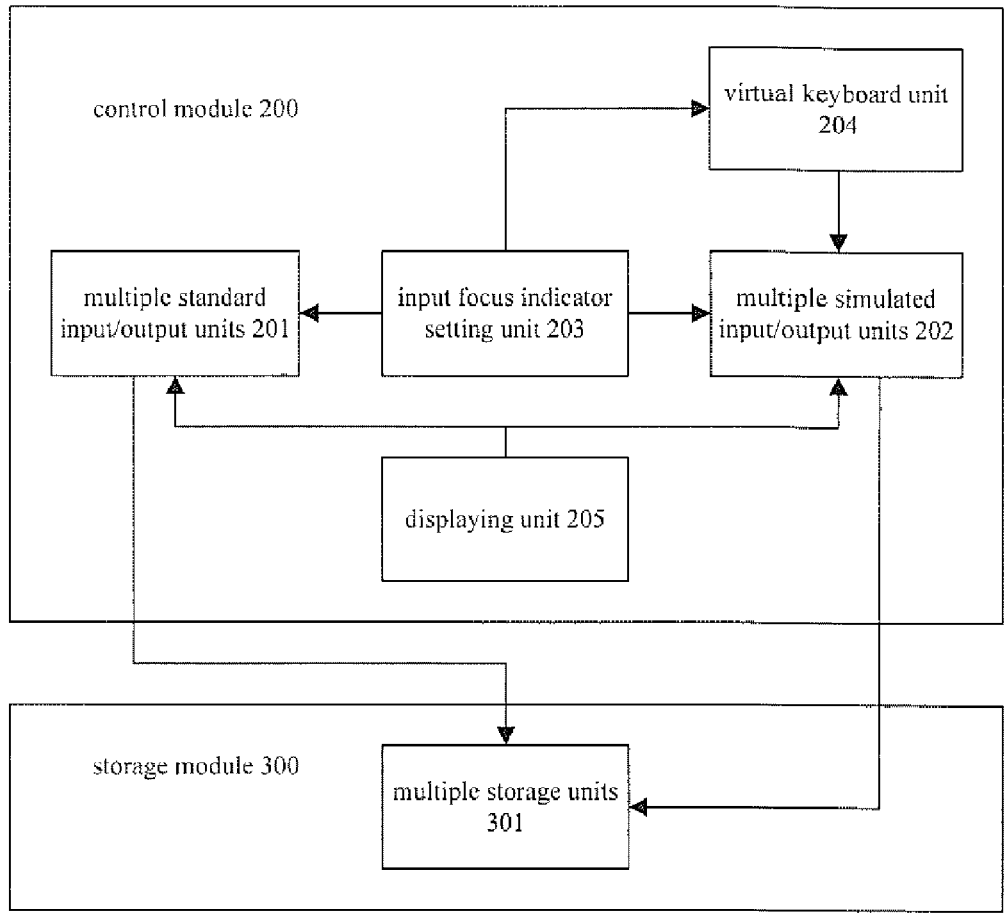
FIG. 2 is a structural diagram illustrating virtual keyboard input means with multiple input focuses according to embodiment 2 of the invention.

Referring to FIG. 2, the embodiment of the invention provides a virtual keyboard input means with multiple input focuses, which includes a control module 200 and a storage module 300;

The control module 200 includes a plurality of standard input/output units 201 adapted to receive mouse click message;

a plurality of simulated input/output units 202 adapted to receive mouse click message, The standard input/output units 201 and the simulated input/output units 202 are equal in numbers and have a relationship of one-to-one correspondence;

an input focus indicator setting unit 203 adapted to set the current input focus indicator as the indicator of the standard input/output unit 201 according to the correspondence relationship between the standard input/output unit 201 and the focus indicator when the standard input/output unit 201 is clicked by the mouse; to set the current input focus indicator as the indicator of the simulated input/output unit 202 according the correspondence relationship between the simulated input/output unit 202 and the focus indicator when the simulated input/output unit 202 is clicked by the mouse;

a virtual keyboard unit 204 adapted to store mapping relationship between the coordinates and the characters and confirm the corresponding character according to the position of mouse click if the user clicks the virtual keyboard with the mouse; In the mode of the virtual keyboard input mode, if the character is a keyboard character; the virtual keyboard unit 204 finds a corresponding simulated input/output unit 202 according to the current input focus indicator and stores the keyboard character in a storage unit corresponding to the found simulated input/output unit 202; if the character is a status character, the virtual keyboard unit performs status processing according to the status; if the character is a control character, the virtual keyboard unit 204 finds a corresponding simulated input/output unit according to the current input focus indicator and controls the simulated input/output unit to redraw the appearance of the simulated input/output unit according to the control character; the step of redrawing the appearance of the simulated input/output unit includes shifting the cursor and/or deleting the content displayed in the simulated input/output unit and the content stored in the storage area;

a displaying unit 205 adapted to display virtual keyboard and a plurality of simulated input/output units 202 in virtual keyboard input mode.

A storage module 300 includes:

a plurality of storage units 301 adapted to store character input by the user by using the standard keyboard or virtual keyboard; the storage units are equal with the standard input/output units in numbers; each of the storage units corresponds to a pair of standard input/output unit and simulated input/output unit having the one-to-one correspondence relationship.

Generally, the simulated input/output unit 202 has a function of drawing. When the user input characters in the simulated input/output unit 202, the simulated input/output unit further draws symbols such as dot or * in a displaying box to simulate the input of character; In addition, a highlight vertical line is drawn at the specified position of cursor area to simulate input cursor; a highlight cursor and a normal cursor are drawn in returns at regular time period to simulate twinkle of the cursor, etc.

Furthermore, the control module 200 further includes a switch unit adapted to switch the mode between virtual keyboard input mode and standard keyboard input mode when the received mouse click message is input mode switching message.

In the embodiment, the display unit 205 includes:

a sub-determining unit adapted to determine whether the current input mode is virtual keyboard input mode;

a first sub-displaying unit adapted to display the virtual keyboard and the a plurality of simulated input/output unit 202 when the sub-determining unit determines that the current input mode is virtual keyboard input mode;

a second sub-displaying unit adapted to display the a plurality of simulated input/output units 201 when the sub-determining unit determines that the current input mode is standard keyboard input mode.

In the embodiment, when the displaying unit includes the sub-determining unit, the first sub-displaying unit, the second sub-displaying unit, the control module 200 receives the characters input by the user in the standard keyboard input mode. The control module 200 further includes:

a first standard keyboard character receiving unit adapted to receive the characters input by the user by using the physical keyboard after the displaying unit 206 displays a plurality of standard input/output units 201, to find a corresponding standard input/output unit 201 according to the current input focus indicator and store the character into the storage unit 301 corresponding to the found standard input/output unit 201.

In the embodiment, the second sub-displaying unit is adapted to display the plurality of standard input/output units 201 and display the virtual keyboard when the sub-determining unit determines that the current input mode is standard input mode; accordingly, the virtual keyboard unit 204 is also adapted to, after confirming the character according to the mouse click position, in the standard keyboard input mode, if the confirmed character is a keyboard character, find a corresponding standard input/output unit 201 according to the current input focus indicator and store the confirmed character in the storage unit 301 corresponding to the standard input/output unit 201, if the confirmed character is a status character, to perform corresponding status processing, if the confirmed character is a control character, to find a corresponding standard input/output unit according to current input focus indicator and control the standard input/output to redraw the appearance of the standard input/output unit according to the control character; the step of redrawing the appearance of the simulated input/output unit includes shifting the cursor and/or deleting the content displayed in the simulated input/output unit and the content stored in the storage area.

In the embodiment, the content drawn and displayed in the simulated input/output unit is expressed in dot strings; the content drawn and displayed in the standard input/output unit is expressed in character strings. In the embodiment, the control characters includes the characters which control the position of the cursor such as Backspace, Left, Right, Home and End. Redrawing the appearance of the simulated input/output unit according to the control character displays the change of the cursor position (including shifting to left and shifting to right) and the content displayed in the simulated input/output unit and the change of the content stored in the storage area (including increasing content and deleting content). The detail is same as it in embodiment 1, no more details here.

In addition, in the embodiment, in the virtual keyboard input mode, the control module 200 receives characters input by the user by using the physical keyboard. So that the control module 200 further includes:

a second standard keyboard character receiving unit adapted to receive the character input by the user by using of the physical keyboard, to find the corresponding simulated input/output unit 202 according to the current input focus indicator, and to store the character in the storage unit 301 corresponding to the simulated input/output unit 202.

In the embodiment, the control module 200 further includes:

a checking unit adapted to check the current input focus indicator regularly and set the current input focus indicator as the focus indicator of input/output unit according to the input/output unit in which the current input focus is. For example, MFC timer message (WM_TIMER) is triggered at preset time intervals and the checking unit receives the MFC timer message, and then checks the current input indicator, and sets the current input focus indicator as the focus indicator of the input/output unit according to the input/output unit in which the current input focus is.

The virtual keyboard 204 further is adapted to modify the stored mapping relationship between the coordinates and the character randomly.

In the embodiment, the standard input/output unit 201 is window control with character entering function.

The simulated input/output unit 202 further includes:

a sub cursor calculating unit adapted to calculate the position of the cursor. For example, when the characters input are increased, the sub cursor calculating unit calculates the position where the cursor shift right; when an input character is deleted, the sub cursor calculating unit calculates the position where the cursor shift left; when the mouse clicks the simulated input/output unit 202, the sub cursor calculating unit calculates the position of mouse click to which the cursor shifts.

In the embodiment, the simulated input/output unit 202 further includes that:

the control module includes Windows interface and Windows message processing program. The Windows message processing program is bonded with the Windows interface by Windows function DialogBox. In addition, the Windows message processing program is bonded with the control by the Windows function DialogBox instead of default message mapping predefined by MFC. The switch of the input mode can be implemented by the CheckBox control of the control module window; The standard input/output unit can be Edit control of the control module window; The simulated input/output unit can be self-drawing control based on Button control without input function and defined Windows message processing program. Because the Button control has no function of input, the simulated input/output unit has not input focus defined by the MFC.

The embodiment of the invention solved the deficiency of the prior art. With the simple construction and stable performance, a plurality of output controls share one virtual keyboard. The invention meets the actual need and provides a safe and improved human-computer interaction.

Embodiment 3

Figure 3:
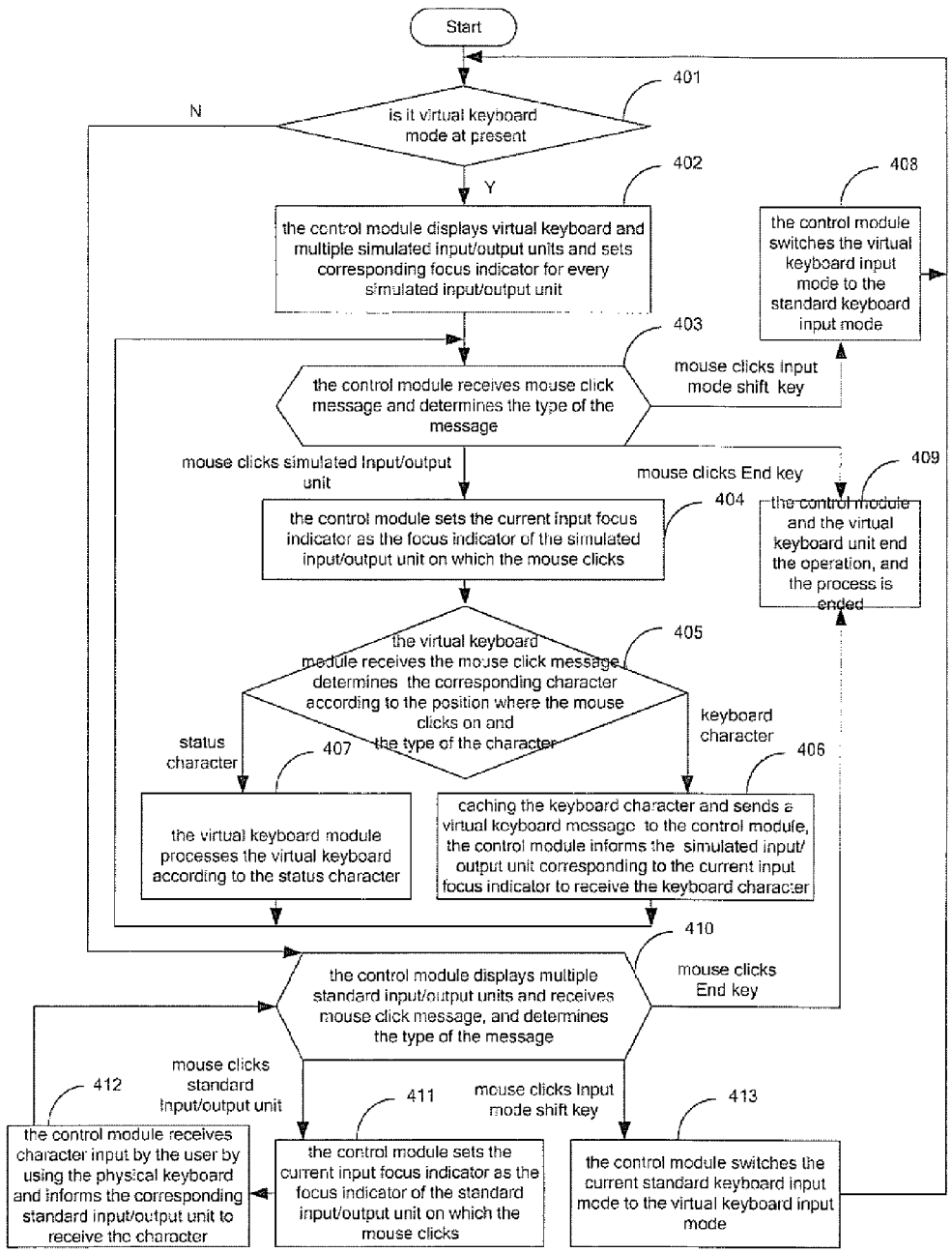
FIG. 3 is a flow chart illustrating an input method of virtual keyboard with multiple input focuses according to embodiment 3 of the invention.

Referring to FIG. 3, the embodiment of the invention provides an input method of a virtual keyboard with multiple input focuses.

Step 401: a control module determines whether current input mode is virtual keyboard input mode, if so, go to step 402; otherwise, go to step 410.

Step 402: the control module displays a virtual keyboard and a plurality of simulated input/output units within specified area, and a virtual keyboard module sets up the corresponding focus symbol of every simulated input/output unit; generally, the virtual keyboard is displayed as sub-window within the specified area. And in the virtual keyboard input mode, a standard input/output unit is hidden. That is, the standard input/output unit is not displayed to a user.

The simulated input/output unit has a function of drawing and can be used to draw the appearance of the simulated input/output unit. When the user inputs a character to the simulated input/output unit, the simulated input/output unit draws symbol such as dot or * in the display box to simulate inputting character. In addition, the simulated input/output unit draws a highlight vertical line in specified position at the cursor area to simulate input status of cursor; the simulated input/output unit draws a highlight vertical line and a normal vertical line in turns at regular intervals at the specified position to simulate the twinkle of the cursor, etc.

In addition, the simulated input/output unit has a function of calculating cursor position. With the shift of characters being input, the cursor position is calculated automatically. For example, when the characters are input increasingly, the position where the cursor shifts right to is calculated; when the characters are deleted, the position where the cursor shifts left to is calculated; when the mouse clicks on the simulated input/output unit, the position of mouse click where the cursor shifts to is calculated, etc.

Step 403: the control module receives message of mouse click and determines the mouse clicks on a simulated input/output unit, an input mode shift key or End key, if the mouse clicks on one of the simulated input/output units described above, go to step 404; if the mouse clicks on the input mode shift key, go to step 408; if the mouse clicks on the End key, go to step 409.

Step 404: the control module sets the current input focus indicator as the focus indicator of the simulated input/output unit the mouse clicked on.

Step 405; the virtual keyboard module receives the message of mouse click, determines the corresponding character according to the position of mouse click and determines whether the character is a keyboard character or a status character, if the character is a keyboard character, go to step 406, if the character is a status character, go to step 407.

The mapping relationship between the coordinates of the virtual keyboard and the characters is pre-stored in the virtual keyboard. When the mouse clicks on a coordinate point on the screen, a character corresponding to the coordinate point is input. The characters include keyboard characters and status characters. The keyboard characters include letters and numbers. The status characters include characters except keyboard characters, for example, Shift key, CapsLock key etc.

Step 406: the virtual keyboard module caches the keyboard character and sends a message of virtual keyboard to the control module. When the control module receives the message, the control module informs the corresponding simulated input/output unit to receive the keyboard character from cache, then go back to step 403.

Step 407: the virtual keyboard module is subjected to status processing according to the status character, then go back to step 403.

For example, if the status character is CapsLock key, the virtual keyboard unit redraws the virtual keyboard, in which the letters displayed are capitalized. Generally, the mapping relationship between the coordinates of the redrawn virtual keyboard and the characters are different from the previous mapping relationship between the coordinates of the virtual keyboard and the characters. The subsequent process will be performed according to the new mapping relationship between the coordinates of the redrawn virtual keyboard and the characters.

Step 408: the control module modifies the current virtual keyboard input mode to standard keyboard input mode, and go to step 401.

Step 409: the control module and the virtual keyboard module ends operation, and the process is ended.

Step 410: the current input mode is standard keyboard input mode and the control module displays a plurality of standard input/output units, receives a message of mouse click and determines the mouse clicks on the standard input/output unit, the input mode shift key or End key, if the mouse clicks on the standard input/output unit, go to step 411; if the mouse clicks on the input mode shift key, go to step 413; if the mouse clicks on the End key, go to step 409.

Generally, in the standard keyboard input mode, the control module can hide the simulated input/output unit and does not to display the simulated input/output unit to the user.

In the embodiment, there are a plurality of standard input/output units and simulated input/output units as well. The standard input/output units and the simulated input/output units are equal in numbers and have one-to-one correspondence relationship. Every pair of input/output unit and the simulated input/output unit having the one-to-one correspondence relationship corresponds to a commonly used storage unit. The commonly used storage unit is for storing the character received by the standard input/output unit or the simulated input/output unit. The character input by the user to the standard input/output unit or the simulated input/output unit will be stored in the commonly used storage unit. For example, the user inputs characters A and B by standard keyboard, and inputs characters C and D by virtual keyboard. All of A, B, C and D are stored in the commonly used storage unit.

Step 411: the control module sets the current input focus indicator as focus indicator of the standard input/output unit.

Step 412: the control module receives character input by the user by using of the physical keyboard and informs the corresponding standard input/output unit to receive the character, then go back to step 410.

In the embodiment, in the standard input mode the way that the control module informs the standard input/output unit receives character input by the user by using the physical keyboard in the standard input mode can be substituted by the way that the virtual keyboard module receives character input the user by using the virtual keyboard and sends the character to the standard input/output unit. So that the step 412 can be substituted by the following step:

The control module displays virtual keyboard. The user clicks the virtual keyboard. The virtual keyboard module confirms the corresponding character according to the position of mouse click and determines whether the corresponding character is a keyboard character or a status character; if the corresponding character is a keyboard character, the virtual keyboard module sends the keyboard character to the control module. The control module sends the received keyboard character to the corresponding standard input/output unit according to the current input focus indicator; if the corresponding character is status character, the virtual keyboard module is subjected to status processing according to the corresponding status; and go back to step 410.

Step 413: the control module modifies the current standard keyboard input mode to virtual keyboard input mode, then go back to step 401.

The method above further includes:

The control module checks the current input focus regularly and sets the current input focus indicator as the focus indicator of the input/output unit. For example, the control module triggers MFC timer message (WM_TIMER) at preset time intervals. The control module receives the message and checks the current input focus and sets the current input focus indicator as the focus indicator of input/output unit according to the input/output unit in which the current input focus is.

In addition, in the embodiment, the virtual keyboard module modifies the mapping relationship between the stored coordinates and the characters randomly at anytime, which enhances the security.

In the embodiment, the control module and the virtual keyboard module are implemented by two MFC Windows respectively; The shifting between the input modes is implemented by CheckBox control of control module window; The standard input/output unit is edit control of control module window; the simulated input/output unit is self-drawing control based on Button control without input function. Because Button control has not function of input, the simulated input/output unit has not input focus which MFC defined.

In addition, in the embodiment, in virtual keyboard mode the way that the virtual keyboard module receives the character input by the user by using virtual keyboard can be replaced by the way that the control module receives the character input the by user by using physical keyboard. That is, Steps 305-307 can be substituted by the following step:

The control module receives the character input by the user by using the physical keyboard and informs the corresponding simulated input/output unit to receive the character according to the current input focus indicator.

In the embodiment, there are multiple MFC messages which the control module and virtual keyboard module can process. For example, OnMyInitDialog ( ) ; // dialogue box is initialized and responds to WM_INITDIALOG:
   OnMyOK( ) ; / clicking on " Yes", responding WM_COMMAND+ IDOK
   OnMyCancel( ) ; // clicking on " cancel", responding to WM_COMMAND+
IDCANCEL -continued

```
    OnMyCheck( ) ; // shifting input mode, responding to WM_COMMAND+
IDC_CHECK
    OnMyChangeEdit ( ) ;// inputting password, responding to WM_COMMAND+
IDC_EDIT:+ EN_CHANGE
    OnMyDrawItem(wParam,lParam) ; // control performs self-drawing and is
adapted for drawing of the simulated input/output unit
    OnMyLButtonDown (wParam,lParam) ; // mouse clicking
    OnMyShowWindow( ) ; // interface refreshing
    OnMyPaint( ) ; //interface drawing
    OnMyDestroy ( ) ; // interface is destroyed and the module ends operation
    OnMyPowerBroadcast( ) ; // system sleeping/waking up
```

Embodiment 4

Figure 4:
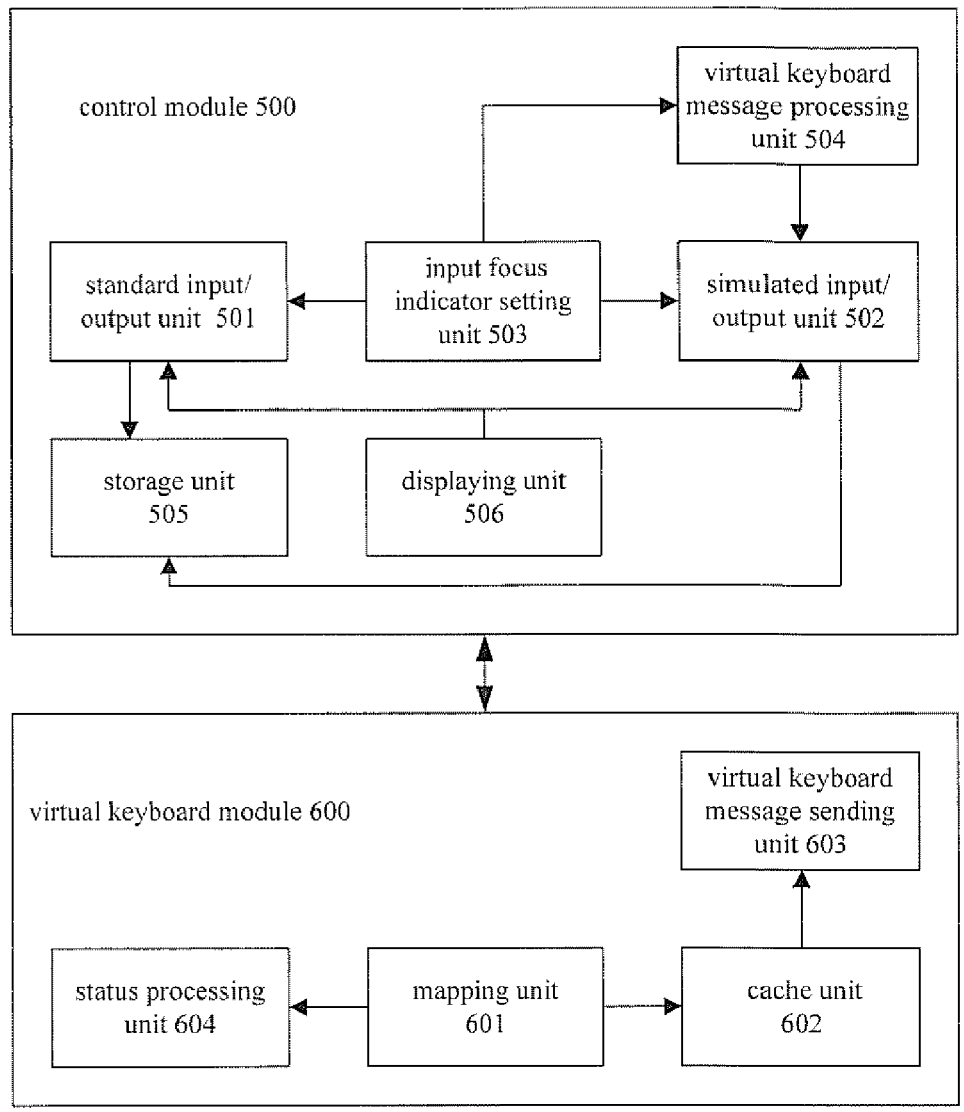
FIG. 4 is a structural diagram illustrating virtual keyboard input means with multiple input focuses according to embodiment 4 of the invention.

Referring to FIG. 4. the embodiment of the invention provides a virtual keyboard input means with multiple input focuses, which includes a control module 500 and a virtual keyboard module 600;

The control module 500 includes:

a standard input/output unit 501 adapted to receive message of mouse click and characters input by the user by using a standard keyboard;

A simulated input/output unit 502 adapted to receive message of mouse click and character input by the user by using of the virtual keyboard;

An input focus indicator setting unit 503 adapted to set the current input focus indicator as focus indicator of the standard input/output unit 501 if the standard input/output unit 501 is clicked by the mouse; to set the current input focus indicator as focus indicator of the simulated input/output unit 502 if the simulated input/output unit 502 is clicked by the mouse;

A virtual keyboard message processing unit 504 adapted to inform the corresponding simulated input/output unit 502 to receive keyboard character cached by the virtual keyboard module according to the current input focus indicator, when the virtual keyboard message sent by the virtual keyboard module is received;

A storage unit 505 adapted to store characters input by the user by using of the standard keyboard or virtual keyboard;

A displaying unit 506 adapted to display standard input/output unit 501 in the standard keyboard input mode; to display virtual keyboard and simulated input/output unit 502 in the virtual keyboard input mode;

The virtual keyboard module 600 includes:

a mapping unit 601 adapted to store mapping relationship between coordinates and characters; correspondence between the simulated input/output unit 602 and the focus indicator; and correspondence between the standard input/output unit 601 and the focus indicator; to output the corresponding character according to the position of mouse click if any;

a cache unit 602 adapted to cache keyboard character if the character output by the mapping unit 601 is a keyboard character;

a virtual keyboard message sending unit 603 adapted to send virtual keyboard message to the control module 500 if the cache unit 602 has a cached keyboard character;

a status processing unit 604 adapted to process the virtual keyboard according to the corresponding status if the mapping unit 601 output a status character.

Generally, the simulated input/output unit 502 has a function of drawing. When the user inputs characters in the simulated input/output unit 502, the simulated input/output unit further draws symbols such as dot or * in a displaying box to simulate the input of character; In addition, a highlight vertical line is drawn at the specified position of cursor area to simulate input cursor; a highlight cursor and a normal cursor are drawn in returns at regular time interval to simulate twinkle of the cursor, etc.

The control module 500 further includes:

a switch unit adapted to modify the current virtual keyboard input mode to standard keyboard input mode if the simulated input/output unit 502 receives input mode switching message of mouse click; to modify the current standard keyboard input mode to virtual keyboard input mode if the standard input/output unit 501 receives input mode switching message of mouse click.

In the embodiment, the control module 500 further includes a determining unit adapted to determine whether the current input mode is virtual keyboard input mode;

a first informing unit adapted to inform the displaying unit 506 to display virtual keyboard and the simulated input/output unit 502 if the determining unit determines that the current input mode is virtual keyboard input mode;

a second informing unit adapted to inform the displaying unit 506 to display the standard input/output unit 501 if the determining unit determines that the current input mode is standard keyboard input mode.

In the embodiment, if the control module 500 includes the determining unit, the first informing unit and the second informing unit, the control module 500 is further adapted to receive character input by the user by using of the physical keyboard in the standard keyboard input mode. The control module 500 further includes a first standard keyboard character receiving unit adapted to receive the character input by the user by using of a physical keyboard and inform the corresponding standard input/output unit 501 to receive the character according the current input focus indicator, with the fact that the display unit 506 displays standard input/output unit 501 according to information sent from the second informing unit.

In the embodiment, the second informing unit is also adapted to inform the displaying unit 506 to display the standard input/output unit 201 and display the virtual keyboard as well, if the determining unit determines that the current input mode is standard keyboard input mode; correspondingly, the virtual keyboard mode 600 further includes:

a virtual keyboard character sending unit adapted to send the keyboard character output by the mapping unit 601 to the control module 600 in the standard keyboard input mode.

Furthermore, the control module 500 further includes:

a virtual keyboard character receiving unit adapted to send the keyboard character to the corresponding input/output unit 501 according to the current input focus indicator after receiving the keyboard character sent from the virtual keyboard module 600.

In addition, in the embodiment, the control module 500 is further adapted to receive the character input by the user by using of the physical keyboard in the virtual keyboard input mode. The control module 500 further includes a second standard keyboard character receiving unit adapted to receive the character input by the user by using of the physical keyboard and inform the corresponding simulated input/output unit 502 to receive the character according to the current input focus indicator in the virtual keyboard input mode.

In the embodiment, the control module 500 further includes:

a checking unit adapted to check the current input focus indicator regularly and set the current input focus indicator as the focus indicator of input/output unit according to the input/output unit in which the current input focus is. For example, MFC timer message (WM_TIMER) is triggered at preset time intervals and the checking unit receives the MFC timer message, and then checks the current input indicator, and sets the current input focus indicator as the focus indicator of the input/output unit according to the input/output unit in which the current input focus is.

The virtual keyboard module 600 further includes:

a scramble unit adapted to modify the mapping relationship between the coordinates and characters stored in the mapping unit 601 randomly.

The standard input/output unit 501 in the embodiment can be the MFC control with character input feature.

The simulated input/output unit 502 further includes:

a sub cursor calculating unit adapted to calculate the position of the cursor. For example, when the character input is increased, the sub cursor calculating unit calculates the position where the cursor shift right; when the input character is deleted, the sub cursor calculating unit calculates the position where the cursor shift left; when the mouse clicks the simulated input/output unit 502, the sub cursor calculating unit calculates the position of mouse click to which the cursor shifts.

In the embodiment, the simulated input/output unit 502 further includes:

a sub drawing unit adapted to draw the appearance of the simulated input/output unit 502.

In the embodiment, the control module 500 and the virtual keyboard module 600 are implemented by two MFC window classes. The switch unit is implemented by the CheckBox control of the window of the control module 600. The standard input/output unit 501 is implemented by the Edit control of the window of the control module 500. The simulated input/output unit 502 is self-drawing control based on the Button control without input feature. Because the Button control has no input feature, the simulated input/output unit 502 has no input focus defined by MFC.

The embodiment of the invention solved the deficiency of the prior art. With the simple construction and stable performance, multiple output controls share one virtual keyboard. The invention meets the actual need and provides a safe and improved human-computer interaction.

Preferred embodiments are described above, which is not intended to limit the invention. Any modification, equivalents and improvement without departing from the spirit and principle of the invention should be included in the scope of the invention.

The invention claimed is:

1. A virtual keyboard input means with multiple input focuses, wherein the means includes a control module and a virtual keyboard which is a virtual keyboard unit controlled by the control module or a virtual keyboard module communicated with the control module;

if the virtual keyboard is a virtual keyboard unit controlled by the control module, the control module includes:

a plurality of standard input/output units adapted to receive mouse click message;

a plurality of simulated input/output units adapted to receive mouse click message, the number of the standard input/output units equals to that of the simulated input/output units and the standard input/output units have a relationship of one-to-one correspondence with the simulated input/output units;

an input focus indicator setting unit adapted to set the current input focus indicator as the focus indicator of the standard input/output unit according to the correspondence relationship between the standard input/output unit and the focus indicator when the standard input/output unit is clicked by the mouse, and to set the current input focus indicator as the focus indicator of the simulated input/output unit according to the correspondence relationship between the simulated input/output unit and the focus indicator when the simulated input/output unit is clicked by the mouse;

a virtual keyboard unit adapted to store mapping relationship between the coordinates and the characters and confirm the corresponding character according to the position of mouse click if a user clicks the virtual keyboard with the mouse; in virtual keyboard input mode, if the character is a keyboard character, the corresponding simulated input/output unit will be found according to the current input focus indicator and stores the keyboard character in a storage unit corresponding to the found simulated input/output unit; if the character is a status character, the virtual keyboard unit will be subjected to status processing according to the status; if the character is a control character, the corresponding simulated input/output unit will be found according to the current input focus indicator and the simulated input/output unit will be controlled to redraw the appearance of the simulated input/output unit according to the control character; the step of redrawing the appearance of the simulated input/output unit includes shifting the cursor and/or deleting the content displayed in the simulated input/output unit and the content stored in a storage area;

a displaying unit adapted to display the plurality of standard input/output units in the standard keyboard input mode, and to display the virtual keyboard and the plurality of simulated input/output units in the virtual keyboard input mode;

the means also includes a storage module, the storage module includes:

a plurality of storage units adapted to store characters input by the user by using the standard keyboard or the virtual keyboard, the number of the storage units are equal with that of the standard input/output units, and each of the storage units corresponds to a pair of standard input/output unit and simulated input/output unit having the correspondence relationship;

or if the virtual keyboard is a virtual keyboard module communicated with the control module, the control module includes:

a standard input/output unit adapted to receive mouse click messages and characters input by the user by using the standard keyboard;

a simulated input/output unit adapted to receive mouse click messages and characters input by the user by using the virtual keyboard;

an input focus indicator setting unit adapted to set the current input focus indicator as the focus indicator of the standard input/output unit when the standard input/output unit is clicked by the mouse, and to set the current input focus indicator as the focus indicator of the simulated input/output unit when the simulated input/output unit is clicked by the mouse;

a virtual keyboard message processing unit adapted to inform the corresponding simulated input/output unit to receive the keyboard characters cached by the virtual keyboard module according to the current input focus indicator when the virtual keyboard message sent by the virtual keyboard module is received;

a storage unit adapted to store characters input by the user by using the standard keyboard or the virtual keyboard;

a displaying unit adapted to display standard input/output unit in the standard keyboard input mode, and to display virtual keyboard and simulated input/output unit in the virtual keyboard input mode;

the virtual keyboard module includes:

a mapping unit adapted to store the mapping relationship between coordinates and characters, the correspondence relationship between the simulated input/output unit and the focus indicator, the correspondence relationship between the standard input/output unit and the focus indicator, and to output the corresponding character according to the position of mouse click if any;

a cache unit adapted to cache keyboard character if the character output by the mapping unit is a keyboard character;

a virtual keyboard message sending unit adapted to send virtual keyboard message to the control module if the cache unit has cached a keyboard character;

a status processing unit adapted to perform a status process to the virtual keyboard according to the corresponding status if the mapping unit output a status character.

2. The virtual keyboard input means with multiple input focuses of claim 1, wherein the control module further includes:

a switching unit adapted to modify the current virtual keyboard input mode to standard keyboard input mode if the mouse click message received by the simulated input/output unit is input mode switching message, and to modify the current standard keyboard input mode to virtual keyboard input mode if the mouse click message received by the standard input/output unit is input mode switching message.

3. The virtual keyboard input means with multiple input focuses of claim 1, wherein the control module further includes a determining unit adapted to determine whether the current input mode is virtual keyboard input mode;

a first informing unit adapted to inform the displaying unit to display virtual keyboard and the simulated input/output unit if the determining unit determines that the current input mode is virtual keyboard input mode;

a second informing unit adapted to inform the displaying unit to display the standard input/output unit if the determining unit determines that the current input mode is standard keyboard input mode, wherein, the displaying unit is configured to display the virtual keyboard and the simulated input/output unit when the determining unit determines the current input mode is the virtual keyboard input mode, and to display the standard input/output unit when the determining unit determines the current input mode is the standard keyboard input mode.

4. The virtual keyboard input means with multiple input focuses of claim 3, wherein, if the virtual keyboard is a virtual keyboard unit controlled by the control module, the control module further includes:

a first standard keyboard character receiving unit adapted to receive the characters input by the user by using the physical keyboard and find the corresponding standard input/output unit according to the current input focus indicator and store the character into the storage unit corresponding to the found standard input/output unit after the displaying unit displays the plurality of standard input/output unit;

if the virtual keyboard is a virtual keyboard unit communicated with the control module, the control module further includes:

a second standard keyboard character receiving unit adapted to receive the character input by the user by using the physical keyboard and inform the corresponding standard input/output unit to receive the character according the current input focus indicator after the display unit displays the standard input/output unit according to information sent from the second informing unit.

5. The virtual keyboard input means with multiple input focuses of claim 3, wherein, if the virtual keyboard is a virtual keyboard unit communicated with the control module, the second informing unit is adapted to inform the display unit to the standard input/output unit and display the virtual keyboard when the determining unit determines that the current input mode is standard keyboard input mode;

the virtual keyboard module further includes:

a virtual keyboard character sending unit adapted to send the keyboard character output by the mapping unit to the control module in the standard keyboard input mode;

The control module further includes:

a virtual keyboard character receiving unit adapted to send the keyboard character to the corresponding standard input/output unit according to the current input focus indicator, after receiving the keyboard character send from the virtual keyboard module.

6. The virtual keyboard input means with multiple input focuses of claim 3, wherein, if the virtual keyboard is the virtual keyboard unit controlled by the control module, the second informing unit adapted to display the plurality of standard input/output units and display the virtual keyboard when the determining unit determines that the current input mode is standard keyboard input mode;

the virtual keyboard unit further adapted to, after determining the corresponding character according to the mouse click position and in the standard keyboard input mode, if the character is a keyboard character, find a corresponding standard input/output unit according to the current input focus indicator and store the keyboard character into the storage unit corresponding to the found standard input/output unit; if the character is a status character, perform status processing according to the status; if the character is a control character, find a corresponding simulated input/output unit according to the current input focus indicator and control the simulated input/output unit to redraw the appearance of the simulated input/output unit according to the control character, the step of redrawing the appearance of the simulated input/output unit includes shifting the cursor and/or deleting the content displayed.

7. The virtual keyboard input means with multiple input focuses of claim 3, wherein, if the keyboard is a virtual keyboard unit controlled by the control module, the control module further includes:
  a third standard keyboard character receiving unit adapted to receive the characters input by the user by using of the physical keyboard and find the corresponding standard input/output unit according to the current input focus indicator and store the character into the storage unit corresponding to the found standard input/output unit after the display unit displays the plurality of standard input/output units;

if the virtual keyboard is a virtual keyboard module communicated with the control module, the control module further includes:
  a forth standard keyboard character receiving unit adapted to receive the characters input by the user by using of the physical keyboard in the virtual keyboard input mode and inform the corresponding simulated input/output unit to receive the character according to the current input focus indicator.

8. The virtual keyboard input means with multiple input focuses of claim 1, wherein, the control module further includes
  a checking unit adapted to check the current input focus regularly and sets the current input focus indicator as the focus indicator of the input/output unit according to the input/output unit where the current input focus is.

9. The virtual keyboard input means with multiple input focuses of claim 1, wherein the virtual keyboard further includes:
  a scramble unit adapted to modify the existed mapping relationship between the mouse click positions and the characters randomly.

10. An input method of virtual keyboard with multiple input focuses, wherein the method includes:
  in the virtual keyboard input mode, displaying virtual keyboard and a plurality of simulated input/output units and setting corresponding focus indicator for each of the simulated input/output units within the specified area, the virtual keyboard is a virtual keyboard unit controlled by the control module or a virtual keyboard module communicated with the control module;
  If the keyboard is a virtual keyboard unit controlled by the control module, the control module waits for receiving mouse message, wherein the control module determines whether the mouse message is generated from clicking the virtual keyboard by the user, if so, the control module controls the virtual keyboard unit to determine the corresponding character according to the position clicked by the mouse and determines the character is a keyboard character, a control character, or a status character;
  If the character is a keyboard character, with the control of the control module, the virtual keyboard unit finds a corresponding simulated input/output unit according to the current input focus indicator and finds a storage unit corresponding to the found simulated input/output unit from the existed plurality of storage units and stores the keyboard character into the found storage unit, the number of the plurality of storage units equals to that of the plurality of the simulated input/output units and the storage units have a relationship of one-to-one correspondence with the simulated input/output units;
  if the character is a status character, with the control of the control module, the virtual keyboard unit is subjected to status processing according to the status;
  if the character is a control character, with the control of the control module, the virtual keyboard unit finds a corresponding simulated input/output unit according to the current input focus indicator and controls the simulated input/output unit to redraw the appearance of the simulated input/output unit according to the control character; the step of redrawing the appearance of the simulated input/output unit includes shifting the cursor and/or deleting the content displayed in the simulated input/output unit and the content stored in the storage area;
  Otherwise, no performance is executed;
  If the virtual keyboard is a virtual keyboard module communicated with the control module, the control module and the keyboard module wait for receiving the mouse message, the keyboard module determines the corresponding character according to the position clicked by the mouse and determines the character is a keyboard character, a control character, or a status character;
  If the character is a keyboard character, the character is obtained from the virtual keyboard module by the control module, the virtual keyboard module finds a corresponding simulated input/output unit according to the current input focus indicator and finds a storage unit corresponding to the found simulated input/output unit from the existed plurality of storage units and stores the keyboard character into the found storage unit, the number of the plurality of storage units equals to that of the plurality of the simulated input/output units and the storage units have a relationship of one-to-one correspondence with the simulated input/output units;
  if the character is a status character, the virtual keyboard module is subjected to status processing according to the status;
  if the character is a control character, the virtual keyboard module finds a corresponding simulated input/output unit according to the current input focus indicator and controls the simulated input/output unit to redraw the appearance of the simulated input/output unit according to the control character; the step of redrawing the appearance of the simulated input/output unit includes shifting the cursor and/or deleting the content displayed in the simulated input/output unit and the content stored in the storage area.

11. The input method of virtual keyboard with multiple input focuses of claim 10, wherein if the keyboard is a virtual keyboard unit controlled by the control module, the step of determining whether the mouse click message is generated from clicking the virtual keyboard by the user further includes that the control module determines the type of the mouse message as well,
  If the mouse message is generated by that a user clicks input mode switch control, the control module modifies the virtual keyboard input mode to standard keyboard input mode;
  If the mouse message is generated by that the user clicks any simulated input/output unit, the control module sets the current input focus indicator as the simulated input/output unit the user clicked.

12. The input method of virtual keyboard with multiple input focuses of claim 10, wherein before the step of displaying the virtual keyboard and the plurality of simulated input/output unit in the specified area, the method further includes:
  The control module determines whether the current input mode is virtual keyboard input mode, if so, performing the steps of displaying the virtual keyboard and the plurality of simulated input/output unit within the specified area in the virtual keyboard input mode;

otherwise, the control module displays the plurality of standard input/output units and receives mouse click message, and determines whether the mouse clicks the standard input/output units, if so, the control module sets the current input focus indicator as the focus indicator of the standard input/output unit, the number of the standard input/output units equals to that of the simulated input/output units and the standard input/output units have a relationship of one-to-one correspondence with the simulated input/output units, and each of the storage units corresponds to a pair of standard input/output unit and simulated input/output unit having the correspondence relationship.

13. The input method of virtual keyboard with multiple input focuses of claim 12, wherein if the virtual keyboard is a virtual keyboard module communicated with the control module, after the step that the control module sets the current input focus indicator as the focus indicator of the standard input/output unit, the method further includes:

The control module receives the character input by the user by using of the physical keyboard, and informs the corresponding standard input/output unit to receive the character according to the current input focus indicator.

14. The input method of virtual keyboard with multiple input focuses of claim 12, wherein if the virtual keyboard is a virtual keyboard unit controlled by the control module, after the step that the control module sets the current input focus indicator as the focus indicator of the standard input/output unit, the method further includes:

the control module receives the character input by the user by using of the physical keyboard, and finds the corresponding standard input/output unit according to the current input focus indicator, and finds a storage unit corresponding to the found standard input/output unit and stores the character in the found storage unit.

15. The input method of virtual keyboard with multiple input focuses of claim 12, wherein if the virtual keyboard is a virtual keyboard unit controlled by the control module, after the step that the control module sets the current input focus indicator as the focus indicator of the standard input/output unit, the method further includes:

The control module displays virtual keyboard and the user clicks the virtual keyboard by mouse;

With the control of the control module, the virtual keyboard unit determines the corresponding character according to the mouse click position, and determines the character is a keyboard character, a control character, or a status character;

If the character is a keyboard character, with the control of the control module, the virtual keyboard unit finds a corresponding standard input/output unit according to the current input focus indicator and stores the keyboard character into the storage unit corresponding to the found standard input/output unit;

if the character is a status character, with the control of the control module, the virtual keyboard unit is subjected to status processing according to the status;

if the character is a control character, with the control of the control module, the virtual keyboard unit finds a corresponding simulated input/output unit according to the current input focus indicator and controls the simulated input/output unit to redraw the appearance of the simulated input/output unit according to the control character; the step of redrawing the appearance of the simulated input/output unit includes shifting the cursor and/or deleting the content displayed in the simulated input/output unit and the content stored in the storage area.

16. The input method of virtual keyboard with multiple input focuses of claim 12, wherein if the virtual keyboard is a virtual keyboard module communicated with the control module, after the step that the control module sets the current input focus indicator as the focus indicator of the standard input/output unit, the method further includes:

the control module displays virtual keyboard and the user clicks the virtual keyboard by mouse;

the virtual keyboard module confirms the corresponding character according to the position of mouse click and determines whether the corresponding character is a keyboard character or a status character;

if the corresponding character is a keyboard character, the virtual keyboard module sends the keyboard character to the control module, the control module sends the received keyboard character to the corresponding standard input/output unit according to the current input focus indicator;

if the corresponding character is status character, the virtual keyboard module is subjected to status processing according to the corresponding status.

17. The input method of virtual keyboard with multiple input focuses of claim 12, wherein after the step of determining whether the mouse clicks the standard input/output units, the method further includes:

If the mouse click message is a input mode switching message, the control module modifies the current standard keyboard input mode to the virtual keyboard input mode.

18. The input method of virtual keyboard with multiple input focuses of claim 12, wherein, if the virtual keyboard is a virtual keyboard unit controlled by the control module, after the step of setting the current input focus indicator as the focus indicator of the standard input/output unit further includes:

the control module receives the character input by the user by using of the physical keyboard, and finds the corresponding simulated input/output unit according to the current input focus indicator, and stores the character into the storage unit corresponding to the found simulated input/output unit;

if the virtual keyboard is a virtual keyboard module communicated with the control module, after the step of setting the current input focus indicator as the focus indicator of the standard input/output unit further includes:

the virtual keyboard module receives the character input by the user by using of the physical keyboard and informs the corresponding simulated input/output unit to receive the character according to the current input focus indicator.

19. The input method of virtual keyboard with multiple input focuses of claim 10, wherein if the virtual keyboard is a virtual keyboard module communicated with the control module, the method further includes:

the control module checks the current input focus regularly and sets the current input focus indicator as the focus indicator of the input/output unit according to the input/output unit where the current input focus is.

20. The input method of virtual keyboard with multiple input focuses of claim 10, wherein the method further includes:

the virtual keyboard modifies the existed mapping relationship between the mouse click positions and the characters randomly.

* * * * *